United States Patent [19]
Yang et al.

[11] Patent Number: 5,319,006
[45] Date of Patent: Jun. 7, 1994

[54] PREPARATION OF POLYESTERS FROM POLYETHERS BY AN ESTER-INSERTION PROCESS

[75] Inventors: Lau S. Yang, Wilmington, Del.; Diane A. Macarevich, Collegeville, Pa.

[73] Assignee: ARCO Chemical Technology, L.P., Wilmington, Del.

[21] Appl. No.: 979,760

[22] Filed: Nov. 23, 1992

[51] Int. Cl.$^5$ .............................................. C08L 67/00
[52] U.S. Cl. .................................... 523/500; 525/404; 525/408; 525/530; 525/537
[58] Field of Search ................ 523/500; 525/404, 408, 525/530, 537

[56] References Cited

FOREIGN PATENT DOCUMENTS 3435014  3/1986  Fed. Rep. of Germany .

OTHER PUBLICATIONS

*The Cleavage of Ethers,* Department of Chemistry, Northwestern University, Robert L. Burwell, Jr., (1954), pp. 615–685.

*Ferric Chloride in Acetic Anhydride. A Mild 2nd Versatile Reagant for the Cleavage of Ethers,* Bruce Ganem and Vernon R. Small, Jr., J. Org. Chem. vol. 39, No. 25, 1974, pp. 3728–3730.

*Cleavage Reactions of Optically Active Secondary Butyl Methyl Ether,* Contribution from the Department of Chemistry of Northwestern University, Robert C. Burwell, Jr., Lloyd M. Elkin and Lucien G. Maury, vol. 73, pp. 2428–2431.

*Primary Examiner*—Paul R. Michl
*Assistant Examiner*—Edward Cain
*Attorney, Agent, or Firm*—Jonathan L. Schuchardt

[57] ABSTRACT

Polyesters are prepared by a new ester-insertion reaction of a polyether and a cyclic anhydride in the presence of a Lewis acid catalyst. The process is advantageously used to convert polyether polyols recovered from polyurethanes into curable unsaturated polyester resins.

26 Claims, No Drawings

PREPARATION OF POLYESTERS FROM POLYETHERS BY AN ESTER-INSERTION PROCESS

FIELD OF THE INVENTION

The invention relates to the synthesis of saturated and unsaturated polyester compositions from polyethers, including polyether polyols obtained from recycled polyurethanes. The key to the invention is the discovery of a new ester-insertion reaction.

BACKGROUND OF THE INVENTION

Commercial unsaturated polyester resins are prepared by reacting glycols and unsaturated dicarboxylic acids or their derivatives to give liquid polymers of intermediate molecular weight. For example, propylene glycol reacts with maleic anhydride to give an unsaturated polyester resin. Unsaturated polyester resins react with vinyl monomers such as styrene in the presence of radical initiators to give cured, crosslinked solids of high strength.

Saturated polyester polyols are made by reacting glycols with saturated dicarboxylic acids or their derivatives. Saturated polyester polyols are often used for polyurethanes. In spite of the usefulness of both saturated polyester polyols and unsaturated polyester resins, no one has previously taught how to make polyesters from polyethers.

Conversion of a polyether to a polyester requires an initial ether-cleavage reaction. Ether cleavage typically requires harsh reagents such as concentrated sulfuric acid and hydriodic acid, and is generally not commercially attractive. Ganum and Small (*J. Org. Chem.* 39 (1974) 3728) showed that aliphatic ethers react under relatively mild conditions with acetic anhydride and ferric chloride to give esters. Ether-cleavage reactions have apparently not been used to make polyesters from polyethers.

Polyether polyols recovered from polyurethane foams, elastomers, and the like, are a convenient source of polyethers. How best to convert these materials to useful products is still unclear. If recovered polyethers, especially polyether polyols, could be converted practically to other useful polymers, more people could recycle and polyurethanes. Unfortunately polyethers recovered from polyurethanes typically come from many different sources, and are usually complex mixtures. The key is in finding a way to make something useful from the complex polyether mixture.

Polyether polyols give flexibility to polyurethanes. Often, polyurethanes with greater stiffness and strength would be desirable. Cured polyesters are strong and tough, but can often be too stiff or brittle. A desirable product would combine the flexibility advantages of polyurethanes with the toughness and strength of cured polyesters. Such a unique product might be made if only one could find a way to selectively introduce unsaturated polyester linkages into a polyether backbone.

SUMMARY OF THE INVENTION

The invention is a process for making a polyester composition from a polyether. The process comprises reacting the polyether with a cyclic anhydride in the presence of a Lewis acid catalyst. Cyclic anhydride molecules insert at random into carbon-oxygen bonds of the polyether to generate ester bonds in the resulting polyester composition. Particularly useful polyethers for the process are polyether polyols recovered from polyurethanes.

The process of the invention is a practical way to convert recovered polyethers to useful polyesters, especially curable, unsaturated polyester resins. Like conventional unsaturated polyester resins, the resins of the invention will react with a vinyl monomer in the presence of free-radical initiator to produce a cured polyester product.

DETAILED DESCRIPTION OF THE INVENTION

In the process of the invention, a polyether reacts with a cyclic anhydride in the presence of a catalytic amount of a Lewis acid, and the cyclic anhydride molecules insert at random into carbon-oxygen bonds of the polyether to produce a polyester composition.

Polyethers suitable for use in the invention are those derived from base or acid-catalyzed ring-opening polymerization of cyclic ethers such as epoxides, oxetanes, oxolanes, and the like. The polyethers have repeat units of oxyalkylene groups (—O—A—) in which A has from 2 to 10 carbon atoms, preferably from 2 to 4 carbon atoms. The polyethers can have different end groups, depending upon how the polyethers are made or modified. For example, the polyether can have hydroxyl, ester, ether, acid, or amino end groups, or the like, or combinations of these. Mixtures of different types of polyethers can be used.

Preferred polyethers for the process of the invention are polyether polyols. Suitable polyether polyols include, for example, polyoxypropylene polyols, polyoxyethylene polyols, ethylene oxide-propylene oxide copolymers, polytetramethylene ether glycols, oxetane polyols, and copolymers of tetrahydrofuran and epoxides. Typically, these polyols will have average hydroxyl functionalities from about 2 to about 8, and number average molecular weights from about 250 to about 25,000. Preferably, the polyether polyols are recycled polyols derived from a polyurethane foam, elastomer, sealant, or the like.

A cyclic anhydride is used in the process of the invention. The cyclic anhydride may be a saturated cyclic anhydride, an unsaturated cyclic anhydride, or a mixture of these. "Saturated" anhydrides are anhydrides that contain no reactive ethylenic unsaturation, although they may have aromatic rings. Examples of saturated cyclic anhydrides include, but are not limited to, succinic anhydride, phthalic anhydride, tetrahydrophthalic anhydride, alkyl and aryl-substituted succinic anhydrides, halogenated saturated cyclic anhydrides such as tetrabromophthalic anhydride, and the like, and mixtures thereof.

Preferably, the cyclic anhydride used is an unsaturated cyclic anhydride or a mixture of an unsaturated cyclic anhydride and a saturated cyclic anhydride. "Unsaturated" anhydrides contain ethylenic unsaturation. Examples of unsaturated cyclic anhydrides include, but are not limited to, maleic anhydride, citraconic anhydride, itaconic anhydride, halogenated unsaturated cyclic anhydrides, and the like, and mixtures thereof. Maleic anhydride is preferred. When an unsaturated cyclic anhydride is included, the product is an unsaturated polyester resin that can be cured with a vinyl monomer and a free-radical initiator to give a solid polyester product.

The amount of cyclic anhydride used is not critical, although the nature and versatility of the product will depend on whether or not an unsaturated anhydride is used, the relative amounts of unsaturated and saturated anhydride, the proportion of anhydride molecules to polyether units, and other factors. Generally, the total amount of cyclic anhydride used will be within the range of about 0.01 to about 1.1 moles of anhydride per mole of polyether oxyalkylene unit; a more preferred range is from about 0.1 to about 0.8 moles of anhydride per mole of polyether oxyalkylene unit. For example, for a 1000 molecular weight polyoxypropylene polyol, which has an average of about 17 oxypropylene units, the amount of cyclic anhydride used would generally be within the range of about 0.17 to about 19 moles per mole of polyol, and more preferably, from about 1.7 to about 14 moles per mole of polyol.

A Lewis acid catalyzes the process of the invention. Preferred Lewis acids are metal halides of the formula $MX_n$, wherein M is a metal having an oxidation number from 2 to 4, X is a halogen, and n is an integer from 2 to 4. Effective Lewis acids include, but are not limited to, zinc chloride, zinc bromide, stannous chloride, stannous bromide, aluminum chloride, ferric chloride, boron trifluoride, and the like, and mixtures thereof. Particularly preferred are zinc halides and tin(IV) halides. Most preferred are zinc chloride and zinc bromide.

The amount of Lewis acid used is not critical. Generally, the reaction proceeds more rapidly when higher catalyst levels are used. The amount of Lewis acid used is preferably within the range of about 0.01 to about 5 weight percent based on the amount of polyester product made. A more preferred range is from about 0.05 to about 2 weight percent; most preferred is the range from about 0.1 to about 1 weight percent.

The process of the invention is performed by simply combining, in any desired order or manner, the polyether, cyclic anhydride, and Lewis acid, and heating the mixture to the desired reaction temperature. Although any desired reaction temperature can be used, a temperature within the range of about 60° C. to about 240° C. is generally preferred. A more preferred temperature range is from about 100° C. to about 220° C.; most preferred is the range from about 150° C. to about 200° C.

It is preferred, although not necessary, to perform the process of the invention under an inert atmosphere of nitrogen, argon, or the like. Preferably, the reaction mixture is well agitated during the process. The progress of the reaction can be measured by any convenient means. Gel-permeation chromatography is a useful tool for following the progress of the ester-insertion insertion reaction. Reactions are typically complete within about 5-10 h.

The invention includes a process for making a cured polyester product. The process comprises (a) reacting a polyether with a cyclic, unsaturated anhydride in the presence of an effective amount of a Lewis acid as described above to generate an unsaturated polyester resin, (b) combining the unsaturated polyester resin with a vinyl monomer and a free-radical initiator; and (c) heating the mixture at a temperature effective to produce the cured polyester product.

Vinyl monomers suitable for use in the invention include, but are not limited to, vinyl aromatic monomers, vinyl esters of carboxylic acids, acrylic and methacrylic acid esters, acrylamides and methacrylamides, acrylonitrile and methacrylonitrile, alkyl vinyl ethers, allyl esters of aromatic di- and polyacids, and the like, and mixtures thereof. Preferred vinyl monomers are vinyl aromatic monomers, methacrylic acid esters, and diallyl esters of aromatic di- and polyacids. Particularly preferred vinyl monomers are styrene, vinyl toluene, methyl methacrylate, and diallyl phthalate.

Fillers, glass fibers, and the like, and mixtures of these, are optionally included in the cured polyester products made by the process of the invention. Suitable fillers include those commonly known to skilled artisans. Examples of suitable fillers include, but are not limited to, talc, calcium oxide, magnesium silicate, alumina, finely-divided carbon, clays, diatomaceous earth, and the like, and mixtures thereof. Glass fibers of any size or shape can be used to reinforce the polyester. The total amount of filler and/or glass fiber used in the polyester product is preferably within the range of about 1 to about 80 weight percent based on the weight of the cured polyester product; a more preferred range is from about 20 to about 60 weight percent.

The free-radical initiators useful in the invention are any of the peroxide and azo-type initiators that are well known to those skilled in the art of making conventional cured polyester products. Peroxide initiators are preferred. Suitable examples include, but are not limited to, benzoyl peroxide, azobis(isobutyronitrile), and the like. The amount of free-radical initiator used will generally be within the range of about 0.1 to about 5 weight percent based on the weight of the cured polyester product; a more preferred range is from about 0.5 to about 3 weight percent.

The unsaturated polyester resins of the invention are cured at any desired temperature, but preferably at a temperature within the range of about 30° C. to about 200° C.

Polyesther polyols can ordinarily be converted to unsaturated ester-terminated polyethers by end capping the polyols with an unsaturated anhydride such as maleic anhydride. The ester groups are normally restricted to terminal locations, however, and the amount of unsaturation introduced is small enough that crosslinking of these products will not typically give strong, useful materials. Conventional unsaturated polyester resins are made by reacting low molecular weight glycols and unsaturated cyclic anhydrides. This method allows incorporation of enough unsaturation to give crosslinked products of high strength.

In a conventional unsaturated polyester resin synthesis, the structure is fixed by which diacid derivative and which diol are used. Crosslinking is controlled to an extent by using mixtures of saturated and unsaturated diacid deriviatives, or by using mixtures of glycols having different chain lengths.

In contrast, the unsaturated polyester resins of the invention have structural flexibility. The average polyether chain length between the ester linkages and the crosslinkabilty are controlled by adjusting the amount of cyclic anhydride used. Products having a wide range of unsaturation levels can be made from a single polyether polyol and a single cyclic, unsaturated anhydride.

The process of the invention uniquely provides a route to unsaturated polyester resins from recovered polyether polyols. Although the unsaturated polyester resins differ structurally from those produced conventionally, the resins of the invention are conveniently cured to high-strength products using conventional methods.

The following examples merely illustrate the invention. Those skilled in the art will recognize numerous variations that are within the spirit of the invention and scope of the claims.

EXAMPLE 1

Preparation of an Unsaturated Polyester Resin from a Polyether Polyol

A three-neck round-bottom flask equipped with magnetic stirrer, condenser, thermometer, and nitrogen inlet, is charged with a 3000 molecular weight polyether triol (90 g, PO/EO copolymer having about 15 wt.% internal oxyethylene content; flex-slab polyol), maleic anhydride (60 g), and zinc chloride (2.25 g). The reaction mixture is heated to 190° C., and maintained at that temperature for 6 h. Analysis of a sample by gel-permeation chromatography (GPC) indicates $M_w=2700$, $M_n=1100$. The thick mixture is cooled to 120° C., and is poured into styrene (150 g) containing hydroquinone (40 mg) as a stabilizer. The mixture is stable at room temperature.

EXAMPLE 2

Preparation of a Cured Polyester Composition from an Uncured Resin

Benzoyl peroxide (1.5 g) is dissolved in a sample of the unsaturated polyester resin product of Example 1 (75 g). The mixture is poured into a mold, and is heated to 75° C. in an oven. The material cures quickly to a transparent solid that has a smooth, hard surface.

EXAMPLE 3

Preparation of a Filled, Reinforced Polyester Composition

A sample of the unsaturated polyester resin product of Example 1 (75 g) is combined with benzoyl peroxide (1.5 g), talc (50 g), and glass fiber (25 g). The mixture is poured into a mold, and is heated to 75° C. in an oven. The material cures quickly to a hard, strong composite that is insoluble in organic solvents.

EXAMPLE 4

Preparation of an Unsaturated Polyester Resin from a Polyether Polyol: GPC Elucidation of Structure The procedure of Example 1 is followed with 80 g of polyether triol, 20 g of maleic anhydride, and 1.5 g of zinc chloride. Samples are periodically withdrawn from the reactor and analyzed by GPC using both an ultraviolet and a refractive index detector. The chromatograms indicate that the insertion of maleic anhydride into the polyether chains, although initially localized, becomes random as the reaction proceeds. The unsaturated polyester resin product, which has a completely random distribution of maleic anhydride recurring units, has $M_n=1750$ and $M_w/M_n=2.1$.

EXAMPLE 5

Preparation of an Unsaturated Polyester Resin from a Polyether Polyol, Maleic Anhydride, and Phthalic Anhydride The procedure of Example 1 is followed with 70 g of polyether triol, 20 g of maleic anhydride, 15 g of phthalic anhydride, and 0.7 g of zinc chloride. The product is a viscous liquid ($M_n=2700$, $M_w=2.0$) that can be cured by the method of Example 2.

EXAMPLE 6

Preparation of a Cured Polyester Composition from a 4800 Mol. Wt. Polyether Triol and Maleic Anhydride The procedure of Example 1 is followed to make an unsaturated polyester resin from a 4800 mol. wt. polyether triol (70 g, ethylene oxide-capped polyoxypropylene triol; molded foam polyol), maleic anhydride (30 g), and zinc chloride (0.7 g). The product is cured with styrene (50 g) and benzoyl peroxide (1.5 g) by the method of Example 2. The product has tensile strength=8200 psi, elongation=6%.

A conventional unsaturated polyester resin prepared from tripropylene glycol (67 g) and maleic anhydride (33 g), and cured with styrene (50 g) in the presence of benzoyl peroxide (1.5 g) gives a product having tensile strength=3000 psi, elongation=4%.

EXAMPLE 7

Preparation of a Cured Polyester Composition from a 4800 Mol. Wt. Polyether Triol, Maleic Anhydride, and Phthalic Anhydride The procedure of Example 1 is followed to make an unsaturated polyester resin from a 4800 mol. wt. polyether triol (70 g, see Ex. 6), maleic anhydride (21 g), phthalic anhydride (14 g), and zinc chloride (0.7 g). The product is cured with styrene (50 g) and benzoyl peroxide (1.5 g) by the method of Example 2. The product has tensile strength=4000 psi, elongation=35%.

A conventional unsaturated polyester resin prepared from tripropylene glycol (67 g), maleic anhydride (23 g), and phthalic anhydride (15 g), and cured with styrene (50 g) in the presence of benzoyl peroxide (1.5 g) gives a product having tensile strength=3000 psi, elongation=5%.

EXAMPLE 8

Preparation of a Cured Polyester Composition from a 4800 Mol. Wt. Polyether Triol, Maleic Anhydride, and Phthalic Anhydride The procedure of Example 1 is followed to make an unsaturated polyester resin from a 4800 mol. wt. polyether triol (75 g, see Ex. 6), maleic anhydride (18 g), phthalic anhydride (11 g), and zinc chloride (0.7 g). The product is cured with styrene (50 g) and benzoyl peroxide (1.5 g) by the method of Example 2. The product has tensile strength=1600 psi, elongation=63%, and tear strength=245 lb./in.

A conventional unsaturated polyester resin prepared from tripropylene glycol and hexapropylene glycol (73 g of an equimolar mixture), maleic anhydride (19 g), and phthalic anhydride (12 g), and cured with styrene (50 g) in the presence of benzoyl peroxide (1.5 g) gives a product having tensile strength=1700 psi, elongation=28%, and tear strength=235 lb./in.

The preceding examples are only as illustrations; the claims define the true metes and bounds of the invention.

We claim:

1. A process for making a polyester composition from a polyether, said process comprising reacting the polyether with a cyclic anhydride in the presence of from about 0.01 to about 5 weight percent based on the amount of polyester composition of a Lewis acid, wherein cyclic anhydride molecules insert at random into polyether carbon-oxygen bonds to generate ester bonds in the resulting polyester composition.

2. The process of claim 1 wherein the polyether is a polyether polyol selected from the group consisting of polyoxypropylene polyols, polyoxyethylene polyols, ethylene oxide-propylene oxide copolymers, polytetramethylene ether glycols, oxetane polyols, and copolymers of tetrahydrofuran and epoxides.

3. The process of claim 1 wherein the cyclic anhydride is selected from the group consisting of maleic anhydride, succinic anhydride, citraconic anhydride, itaconic anhydride, phthalic anhydride, tetrahydrophthalic anhydride, halogenated cyclic anhydrides, and mixtures thereof.

4. The process of claim 1 wherein the Lewis acid is a metal halide of the formula $MX_n$, wherein M is a metal having an oxidation number from 2 to 4, X is a halogen, and n is an integer from 2 to 4.

5. The process of claim 1 wherein the Lewis acid is selected from the group consisting of zinc halides and tin(IV) halides.

6. The process of claim 2 wherein the polyether polyol is a recycled polyol from a polyurethane product.

7. The process of claim 1 wherein the polyester composition is a saturated polyester polyol.

8. The process of claim 1 wherein the polyester composition is a crosslinkable, unsaturated polyester resin.

9. A process for making an unsaturated polyester resin from a polyether, said process comprising reacting the polyether with a cyclic, unsaturated anhydride in the presence of from about 0.01 to about 5 weight percent based on the amount of unsaturated polyester resin of a Lewis acid, wherein cyclic, unsaturated anhydride molecules insert at random into polyether carbon-oxygen bonds to generate ester bonds in the resulting unsaturated polyester resin.

10. The process of claim 9 wherein the polyether is a polyether polyol selected from the group consisting of polyoxypropylene polyols, polyoxyethylene polyols, ethylene oxide-propylene oxide copolymers, polytetramethylene ether glycols, oxetane polyols, and copolymers of tetrahydrofuran and epoxides.

11. The process of claim 9 wherein the cyclic, unsaturated anhydride is selected from the group consisting of maleic anhydride, citraconic anhydride, itaconic anhydride, and mixtures thereof.

12. The process of claim 9 wherein the Lewis acid is a metal halide of the formula $MX_n$, wherein M is a metal having an oxidation number from 2 to 4, X is a halogen, and n is an integer from 2 to 4.

13. The process of claim 9 wherein the Lewis acid is selected from the group consisting of zinc halides and tin(IV) halides.

14. The process of claim 10 wherein the polyether polyol is a recycled polyol from a polyurethane product.

15. The process of claim 9 wherein the process includes a saturated, cyclic anhydride.

16. A process for making a cured polyester product, said process comprising:
  (a) reacting a polyether with a cyclic, unsaturated anhydride in the presence of from about 0.01 to about 5 weight percent based on the amount of unsaturated polyester resin of a Lewis acid, wherein cyclic, unsaturated anhydride molecules insert at random into polyether carbon-oxygen bonds to generate ester bonds in the resulting unsaturated polyester resin;
  (b) combining the unsaturated polyester resin with a vinyl monomer and a free-radical initiator; and
  (c) heating the mixture at a temperature effective to produce the cured polyester product.

17. The process of claim 16 wherein the polyether is a polyether polyol selected from the group consisting of polyoxypropylene polyols, polyoxyethylene polyols, ethylene oxide-propylene oxide copolymers, polytetramethylene ether glycols, oxetane polyols, and copolymers of tetrahydrofuran and epoxides.

18. The process of claim 16 wherein the cyclic, unsaturated anhydride is selected from the group consisting of maleic anhydride, citraconic anhydride, itaconic anhydride, and mixtures thereof.

19. The process of claim 16 wherein the Lewis acid is a metal halide of the formula $MX_n$, wherein M is a metal having an oxidation number from 2 to 4, X is a halogen, and n is an integer from 2 to 4.

20. The process of claim 16 wherein the Lewis acid is selected from the group consisting of zinc halides and tin(IV) halides.

21. The process of claim 16 wherein the vinyl monomer is selected from the group consisting of styrene, vinyl toluene, methyl methacrylate, and diallyl phthalate.

22. The process of claim 17 wherein the polyether polyol is a recycled polyol from a polyurethane product.

23. The process of claim 16 wherein the process includes a saturated, cyclic anhydride.

24. A polyester composition made by the process of claim 1.

25. An unsaturated polyester resin made by the process of claim 9.

26. A cured, unsaturated polyester product made by the process of claim 16.

* * * * *